June 9, 1936. A. W. HAUFFMAN ET AL 2,043,244
FISH LURE
Filed April 11, 1933
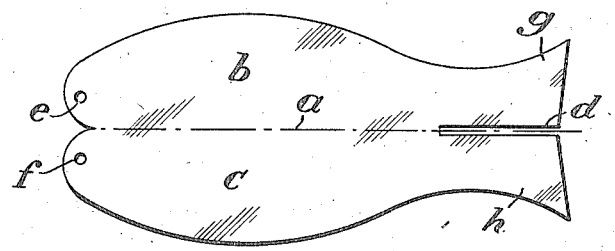
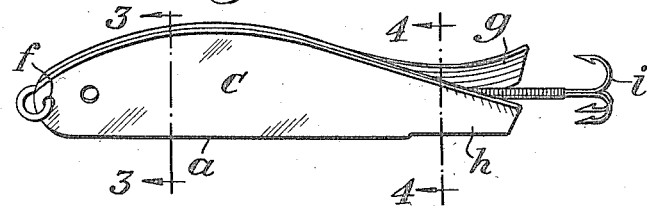
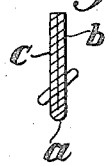 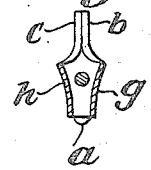
INVENTORS
BY
ATTORNEY Patented June 9, 1936

2,043,244

UNITED STATES PATENT OFFICE 2,043,244

FISH LURE

Axel William Hauffman and Thure Zetterberg, Stockholm, Sweden

Application April 11, 1933, Serial No. 665,500
In Sweden April 22, 1932

3 Claims. (Cl. 43—46)

Hitherto known types of wobbling fish baits or lures usually have a flat or spoon-shaped body. It is well known that such baits possess certain disadvantages. As a general rule their position in the water is horizontal and they consequently lose their similarity to the fish that they are intended to imitate. They are further apt to rotate whereby the line becomes twisted. In both cases these lures sink rather slowly and thus are not suitable for fishing in deep or fast-running water.

The present invention refers to a bait which by a special design eliminates these disadvantages. It can be manufactured easily and cheaply and has a closer resemblance to live bait than the lures hitherto in use.

A preferred embodiment of the invention is shown in the accompanying drawing, which comprises a part of this specification, and of which:

Fig. 1 is a top view of a stamping before being shaped to final form;

Fig. 2 is a view of a completed lure, the lure being tilted so that the top thereof is forward;

Fig. 3 is a cross-sectional view taken on the line 3—3 of Fig. 2, the lure, however, being shown in a vertical position; and Fig. 4 is a cross-sectional view taken on the line 4—4 of Fig. 2, the lure again being in a vertical position.

The stamping shown in Fig. 1 consists of two fish-like parts, $b$ and $c$ connected along the line $a$, each part being a counterpart of the other. In the tail part there is a cut $d$, and in the fore part holes $e$ and $f$ for attaching a ring for connecting the bait to the line. The lure is bent along line $a$ so that the sides come close to each other as shown in Figs. 2 and 3, the tail parts however, on either side of the cut $d$ being separated from one another, so that the tail fins $g$ and $h$ are formed. As shown in Figs. 2 and 4 the tail fins $g$ and $h$ are curved outwardly away from each other, the angle of divergence therebetween increasing from practically zero, where the fins are substantially parallel adjacent to the main body of the lure, to some value less than 90° at the rear ends of the fins. The fins may be curved out more at their upper parts than at their lower. When the lure is pulled through the water, the oppositely curved fins tend to rotate the lure in opposite directions about both horizontal and vertical axes, with the result that the lure oscillates or wobbles about these axes.

Because of the body being closed in the fore part but opening backwards and upwards so that the sides of the aperture are either parallel or form an angle less than 90°, the bait when pulled through the water generally stands back up and belly down.

The hook attachment is preferably secured between the tail fins.

What we claim is:

1. A fish lure comprising a member provided with a single fold and defining two symmetrical portions which are maintained in contact solely by reason of the material of which the member is formed, and spaced connected portions forming tails at one end of said member, said spaced connected portions diverging upwardly and rearwardly and having an intermediate part forming an opening to receive a hook member, said tails being adapted to produce wobbling movement of the lure as it is drawn through the water.

2. A fish lure comprising a member provided with a single longitudinal fold and defining two symmetrical portions which are maintained in contact solely by reason of the material of which the member is formed, and spaced connected portions forming tails at one end of said member, said member having a part forming a recess adjacent said spaced connected tails for receiving a hook member and said tails diverging upwardly and rearwardly to produce wobbling movement of the lure as it is drawn through the water.

3. A fish lure comprising a substantially flat member formed to simulate the appearance and swimming action of a fish when drawn through the water, and spaced connected portions forming tails at one end of said member, said substantially flat member having a part forming an opening adjacent said spaced connected tails for receiving a hook member and said tails diverging upwardly and rearwardly to produce wobbling movement of the lure as it is drawn through the water.

AXEL WILLIAM HAUFFMAN.
THURE ZETTERBERG.